United States Patent

Schlickeiser

[15] 3,675,207

[45] July 4, 1972

[54] TEXT SELECTION ARRANGEMENT IN AUTOMATIC PRINT-OUT DEVICES

[72] Inventor: Klaus Schlickeiser, Boll bei Hechingen, Germany

[73] Assignee: Dipl. Ing. Walter Buhmann Elektro-Apparate-Bau GmbH, Hechingen, Hhz., Germany

[22] Filed: April 21, 1970

[21] Appl. No.: 30,512

[30] Foreign Application Priority Data

April 23, 1969 Germany ....................P 19 20 721.7

[52] U.S. Cl. ....................340/172.5

[51] Int. Cl. ....................G11b 5/56

[58] Field of Search ....................340/172.5, 174.1; 95/4.5

[56] References Cited

UNITED STATES PATENTS

| | | | |
|---|---|---|---|
| 3,258,750 | 6/1966 | Shew | 340/174.1 |
| 3,365,702 | 1/1968 | Heatwole | 340/172.5 |
| 3,471,842 | 10/1969 | Kuehnle | 340/174.1 |
| 3,513,459 | 5/1970 | Behr | 340/174.1 |

*Primary Examiner*—Paul J. Henon
*Assistant Examiner*—Paul R. Woods
*Attorney*—Michael S. Striker

[57] ABSTRACT

A tape has a plurality of parallel tracks holding selectable texts. A text selection is made by marking three digits on a program card, the first controlling the movement of read heads in a direction transverse to the tracks, the second controlling the longitudinal position of the tape relative to the reading heads, and the third selecting one of the reading heads.

18 Claims, 5 Drawing Figures

TEXT SELECTION ARRANGEMENT IN AUTOMATIC PRINT-OUT DEVICES

BACKGROUND OF THE INVENTION

This invention relates to a text selection arrangement for selecting one of a plurality of stored texts for print out. In particular, it relates to such arrangements when a number of such selected texts are to be printed out in sequence. Even more specifically, it relates to automatic print-out devices under control of elongated signal carrier means, such as magnetic tapes.

The term "automatic print-out device" used in this application is understood to comprise any type of automatic print-out device including electric typewriters wherein alphanumeric characters may be printed out selectively either by manual activation of keys, or by automatic input means associated with the print-out device. Under automatic operation, these machines may make use of magnetic tape storage in which a plurality of texts is stored in a plurality of tracks and it is desired to print out the texts automatically. Applications of an automatic print-out device may be increased tremendously if the storage comprises a number of individual texts, so called "text blocks" which may be selectively assembled to constitute a complete text. These text blocks, hereinafter referred to as texts, are stored in designated areas of the storage, and thus means must be provided for selecting sequential text blocks or texts from storage. Of course, it is desirable to store as many texts as possible within one storage. However, the access time must also be considered, namely the time required for selecting an individual text from all available texts. The access time must not be too long, or the operating speed of the device will be too slow.

A known arrangement in a tape controlled print-out device makes use of a switchboard with a plurality of switches, the plurality of switches corresponding to the number of stored texts. Activation of an individual switch causes the tape to be positioned relative to reading means in such a manner that the beginning of the selected text is opposite said reading means. The number of texts which may be selected by this arrangement is rather limited, since the number of switches required occupies a great deal of space.

Another known arrangement operates through use of programs entered, for example, on punched cards. It is usually only possible to place coding for approximately 100 positions on any one punched card and therefore the number of possible texts from which selection may be made, is very limited.

In an other known arrangement, program cards may have sliders affixed to them in such a manner that activation of a slider causes a hole to become exposed. These holes are then sensed by a sensing arrangement. Again, only as many texts may be indicated for selection as sliders can be accommodated on the card.

Furthermore, in all of these known arrangements, the storage containing the texts is only transportable in one direction which means that the selection can be made only in a given order. Therefore the number of variations in which the texts, or text blocks, may be put together to form a complete text is definitely limited.

SUMMARY OF THE INVENTION

It is the object of the present invention to furnish a selection arrangement wherein it is possible to select from a large plurality of available texts a sequence of selected texts to constitute a desired complete text.

It is further desired that the selection of an individual text from a large number of stored texts take place with relatively short access time, thus permitting relatively rapid operating speeds.

The selection of individual texts is to be accomplished in any desired sequence, with use of relatively little equipment and relatively simple circuitry.

The invention comprises a selection arrangement for selecting a text from a plurality of texts recorded on elongated signal storage means. The elongated signal storage means have a plurality of parallel tracks extending in the lengthwise direction. The selection arrangement comprises reading means arranged in operative proximity to said elongated signal storage means. It further comprises first moving means for moving said reading means in a direction transverse to said lengthwise direction, to a transverse position corresponding to a first moving control signal applied to said first moving means. It further comprises second moving means for moving said elongated signal storage means in said lengthwise direction to a lengthwise position corresponding to a second moving control signal applied to said second moving means. Finally, input means are provided. These input means are operatively associated with said first and second moving means for furnishing said first and second moving control signals. In turn, the input means may comprise input reading means for scanning the program means such as program cards on which marks are made, each of said marks selecting a digit value for a digit, a plurality of such digits effecting the selection of a particular text.

The reading means may comprise a plurality of magnetic reading heads. In that case, the first of the above-mentioned digits may specify the transverse position of all of said reading heads relative to the magnetic storage tape. The second digit may signify the lengthwise position of the magnetic storage tape relative to the reading means, while the third digit may cause the selection of a particular magnetic reading head. The particular digit values may be stored in a first, second or third register.

The contents of the third register, as well as effecting the selection of, for example, one reading head out of five, may also be used to select the first or second lengthwise section of the storage tape. That is, the second moving means may be controlled to position the magnetic tape in a longitudinal direction relative to the reading heads so as to put either the first or the second section into reading positions under control of the first register, while controlled to determine the particular number of steps within the section by the contents of the second register.

In a particularly advantageous embodiment of the present invention, the registers are composed of binary stages and have binary-decimal code converters associated with their outputs. Decimal-binary code converters may be associated with the inputs of each register.

In a preferred embodiment of the present invention, the input reading means may scan the above-mentioned digits serially. A step switch (counter) may be provided which opens gating means to each register in synchronism with the scanning of the digit controlling the contents of said register. The program means furnishing the digits may, for example, be cards on which a digit value for each of the three digits is selected by making a mark in one of ten locations assigned to each digit. These marks may then be scanned by means of photoelectric elements which receive light from light sources when the path is not interrupted by one of said marks. Circuits may also be furnished which respond to two marks in locations associated with one digit to stop the advance of the program card. Thus it would be possible to allow manual additions to the text when desired. The arrangement would, of course, also detect errors consisting of more than one mark in locations associated with one digit.

Further features of the present invention may include means for stopping the advance of the program card for a time interval corresponding to the time required, after digits are set into the register, for activating the various moving means and effecting the print out.

Switching means may also be provided to allow, alternatively, manual selection of texts from magnetic storage means, or the above-described program selection.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
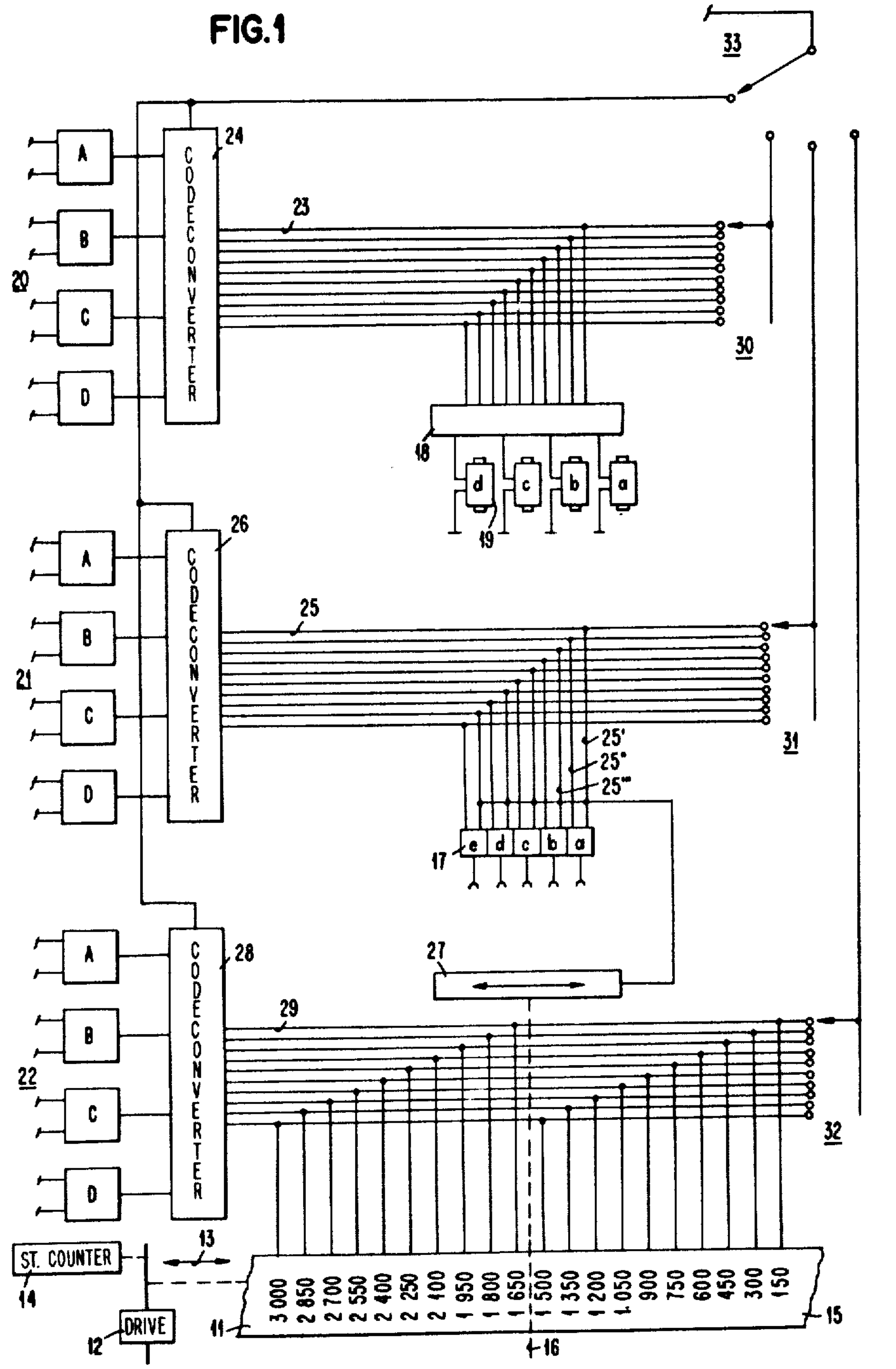
FIG. 1 is a schematic diagram showing the moving control and head selection arrangements and associated registers.

A preferred embodiment of the present invention will now be discussed with reference to the drawing.

FIG. 1 shows elongated signal storage means having a reference numeral 11 which, in this embodiment, comprise a broad magnetic tape having 50 parallel tracks. The tape is driven in the lengthwise direction by second moving means, here embodied in a step motor 12. Counting means 14 are connected to motor 12. The count in the counting means corresponds to the position of the magnetic tape relative to a starting position in the lengthwise direction. The counter may be preset. The tape may be divided into a plurality of sections, one of these sections being numbered 15 in FIG. 1. The value preset in the counter determines the particular section of the tape which is put in position for read out. As indicated by the numerals in the Figure, each section consists of 150 steps. Dividing line 16 indicates that the tape is divided into two groups of 10 sections each. The term "text" as used herein refers to the text stored in any one of these sections. Thus a plurality of texts are stored in each of the parallel tracks included in tape 11.

Read out from tape 11 is accomplished by reading means here 5 magnetic heads 17*a* through 17*e*. The position of the heads relative to the tape is controlled by first moving means, here embodied in torque magnets 19*a* through 19*d* which are adapted to position the magnetic heads in 10 different locations transverse to the direction of tape advancement.

First, second and third registers for storing, respectively, the first moving control signal, the second moving control signal and the read selection signal are also illustrated in FIG. 1 and numbered 20, 22 and 21, respectively. Each of the registers comprises four binary stages labeled A, B, C and D. The output of register 20 is connected via code converter 24 to 10 output lines 23 which are in turn connected to inputs of a code converter 18 associated with the moving means 19. The 10 output lines 25 of a code converter 26 connects to the output of register 21 and leads to magnetic head 17. Lines 25 are connected with the individual magnetic heads 17*a* through 17*e* in such a manner that two sequential lines always lead to the same magnetic head. For example, lines 25' and 25'' are connected to magnetic heads 17*a*.

The first of each of these pairs of lines which are connected to each of the magnetic heads 17, as indicated in FIG. 1 by lines 25', 25''', etc. are connected to a switching arrangement 27 by means of which the tape is positioned either to the value 0 or to the value 1,500, that is, one of a first or second group of sections (divided by dividing lines 16) is selected for read-out. Thus the values entered in registers 20 and 21 allows selection of 50 tracks within each of two different groups of tape sections.

Specifically, switching arrangement 27 is a two position switch, which is in the first position when any one of the odd lines is activated and returns to the second position when no odd line is activated. For any odd number, for example, text sections numbered 1,500 and up would be read out, while for an even number stored in register 21 text sections 0–1500 would be positioned for read-out.

The selection of an individual text (tape section) is then effected by means of the value stored in register 22. By means of this value, via the code converter 28, a particular line 29 is selected which causes the step motor 12 and the step counter 14 to become activated correspondingly. Because of the division of the tape sections along dividing line 16, and the selection of one of the groups of sections by switch 27, the 10 output lines 29 allow selection of 10 sections within each of the two groups of sections.

If manual instead of automatic operation is desired, a switch 33 permits energization of switches 30, 31 and 32, which select one of the lines 23, 25, and 29, respectively, thus allowing selection of a text by manual input.

Figure 2:
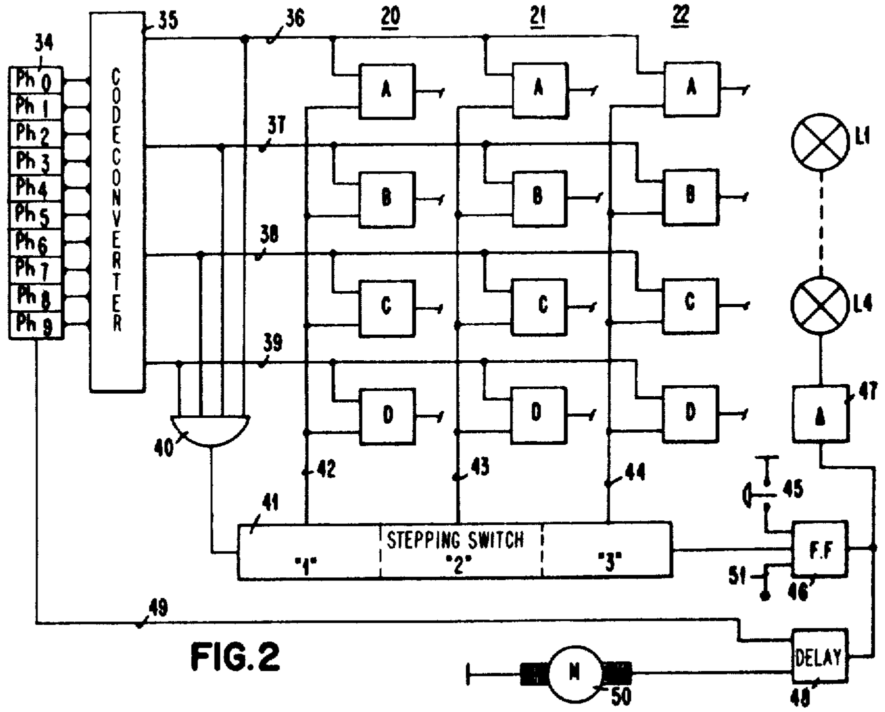
FIG. 2 shows the circuit arrangement for entering the signals into the registers.
Figure 5:
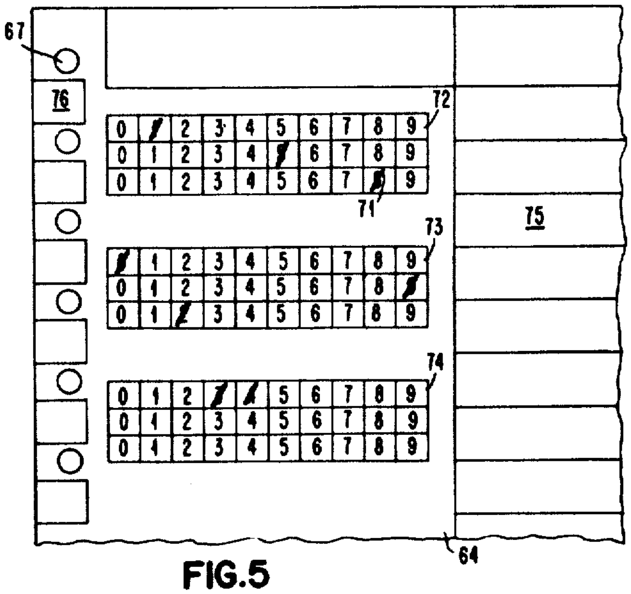
FIG. 5 shows one embodiment of program means.

The circuit arrangement for entering values into registers 20, 21 and 22 is shown in FIG. 2. Here input reading means are embodied in a plurality of photoelectric elements labeled Ph0 – Ph9 and having reference numeral 34. Program means, as for example the card shown in FIG. 5, are moved past the input reading means. The cards may have markings in three rows. Upon appearance of a first signal read-out by one of the photoelectric elements 34, a pulse appears on one or more of lines 36 through 39 which are output lines of a code converter 35 whose input is connected to the output of photoelectric elements 34. The first pulse appearing on any of the lines 36 through 39 causes a step switch 41 to assume its first position. Step switch 41 is energized by any of the lines 36 through 39 via OR gate 40. An output in the first position of the step switch prepares register 20 to receive signals from code converter 35. The next following pulse on lines 36 through 39 causes the step switch to switch to stage 2, thus preparing the stages of register 21. Similarly, movement of the program means to the third row causes step switch 41 to be switched to the third position, preparing stages A, D, C and B of register 22 to receive the signals furnished by code converter 35. In this last stage, a reset pulse is applied to step switch 41, resetting it to its original position. If the marks read out by the photoelectric elements 34 have corresponded to three digits of a three-digit number, then this three-digit number has thus been entered into registers 20, 21 and 22.

The input reading means 34 comprise photoelectric semiconductor elements. Also part of the input reading means and operatively associated with the photoelectric semi-conductor elements are four light sources L1 to L4 which are connected in parallel. The light sources are energized after start switch 45 is depressed by one side of flip-flop 46. The same side of flip-flop 46 also causes energization of the motor 50 which advances the program card and the photoelectric elements. However, the photoelectric elements and the motor are energized after a delay generated in a delay circuit 48 connected to the output of flip-flop 46. The delay time furnished by delay circuit 48 allows full energization of lamps L1 through L4 prior to energization of the photoelements 34 and motor 50. When the last step of step switch 41, namely step 3, has been reached and the step switch reset, the flip-flop 46 is also reset causing the lamps L1 through L4 to be de-energized and the advance of the program means to be stopped as soon as the full three-digit number has been entered into registers 20, 21 and 22. Read-in is resume and the next number is stored after the selection of the desired text has taken place by positioning of the tape, the reading heads, and selection of the proper reading head by means of a signal applied to terminal 51.

Figure 3:
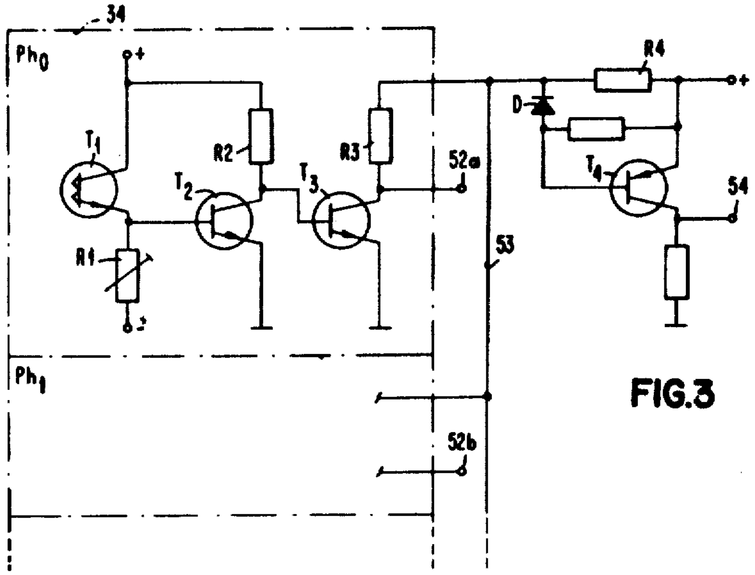
FIG. 3 shows an amplifier circuit for use with the input reading means and a control circuit for the program advance.

FIG. 3 is a detailed circuit diagram of the circuitry associated with one of the photoelectric elements 34. The circuits of the other photoelectric elements are identical. Thus each of the photoelements Ph0 to Ph9 comprises a phototransistor T1 whose sensitivity is adjustable by means of resistance R1. The output, namely the voltage of the emitter of transistor T1 relative to ground is amplified by a two-stage amplifier having transistors T2 and T3. The output of each amplifier stage is derived from a load resistance R3, connected in the collector circuit of transistor T3. The output signals are available at terminals 52*a* through 52*j*.

A mark on the program card interposed between the light source and a transistor such as transistor T1 causes the phototransistor to block and transistor T3 to become conductive. Thus a determined amount of current flows through load resistance R3. Further, the terminal of R3 not connected to the collector of T3 is connected to the positive potential via a resistance R4. The corresponding terminals of all resistors R3, associated with all of the photoelements 34, are connected in common to resistor R4. The resistance R4 is part of a threshold circuit. Thus if more than one mark is opposite photoelements 34, the current from two transistors T3 will flow through resistor R4 causing the total current through R4 to double. This of course increases the voltage drop across R4, thus exceeding the threshold value for transistor T4 and diode D allowing base current to flow in transistor T4, causing the voltage at terminal 54 to become substantially equal to the positive supply potential. A signal appearing at terminal 54 energizes a control arrangement which stops the print-out device. This control arrangement is not shown. The threshold output signal at terminal 54 thus serves two purposes. First, two marks within one row indicate an error and thus the print out should be stopped. Secondly, two marks may have been entered on purpose in order to stop the print out, thus allowing manual additions to the text at predetermined points.

Figure 4:
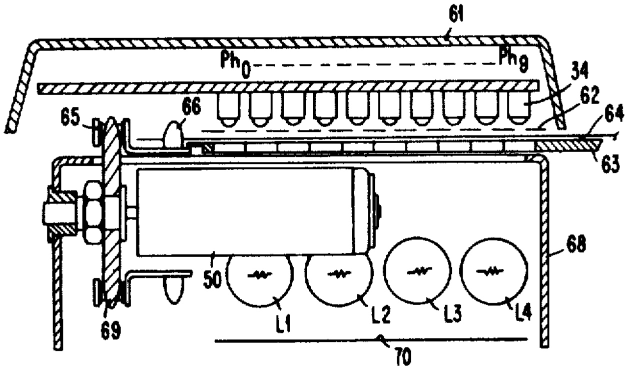
FIG. 4 is a view of the input reading means, partly in section.

The photoelectric input arrangement is shown in FIG. 4. The upper part of the arrangement comprises a cover 61 under which the phototransistors Ph0 – Ph9 with their associated amplifiers are arranged in a row. Immediately thereunder is a shutter 62 which has small openings immediately underneath each photoelement. The shutter serves to suppress stray light. The program card 64 is fed in under shutter 62 on top of a paper base. An endless chain 65 serves to advance program card 64 by engaging in holes 67 provided in the program card for this purpose. The lower housing 68 contains the sprocket wheels 69 and the motor 50 for the chain drive. The housing 68 also contains the light sources L1 through L4 and, underneath said light sources, a reflecting surface 70 for assuring a substantially even illumination for the photocells.

Program means 64 shown in FIG. 5 comprise a card or a sheet for containing the so-called "write orders." Each card has certain areas each of which contains three rows, each of the rows containing locations for the values 0 – 9, respectively. It must be remembered that each magnetic tape section, that is each text, is selectable my means of one three-digit number entered into registers 20, 21 and 22. Thus a mark 71 in each of the three rows within an area and subsequent sensing of these three rows through the input arrangement, causes selection of the desired text. In the example shown here in area 72, the three-digit number is 851 as indicated by the numbers 851 having a black mark drawn therethrough. The numbers may be selected in a completely arbitrary sequence, that is they must not, necessarily, be either in a descending or an ascending order. For example, the number entered into area 72 in FIG. 5 is the number 290. This is because step counter 14 (FIG. 1) can count in both a forward and a reverse direction.

It is seen that in area 74, two marks are entered into the same row. Upon scanning of this row, the automatic print out will be stopped as explained above. This allows manual additions to the text to be made. These manual additions can be written into line 75 on the program card. Holes 67 serve to allow the transport of the cards as mentioned above. Areas 76 arranged underneath the transport hole 67 may serve to accommodate sorting numbers or similar data. All printing on program card 64 is done in a color for which photoelements 34 generate the same photo current as for white light. Thus only marks 71 serve to interrupt the photo current.

Since the program means 64 in the above-described input arrangement are transported solely at one edge, and no further mechanical means for either the program advance or program stopping is provided, there is little restriction on the format of said program means 64. So-called "endless" forms which continually pass through the above-described input means, can of course also be processed.

While the invention has been illustrated and described as embodied in particular control circuits and mechanisms, it is not intended to be limited to the details shown, since various modifications, structural, mechanical and electrical changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Text selection arrangement, comprising, in combination, elongated signal carrier means having a plurality of parallel tracks extending in the lengthwise direction thereof, and having a plurality of texts recorded in at least one of said plurality of parallel tracks; a plurality of reading means arranged in operative proximity to said elongated signal carrier means in a direction transverse to said lengthwise direction; first moving means responsive to a first moving control signal for moving said reading means in said transverse direction to a transverse position corresponding to said first moving control signal; second moving means responsive to a second moving control signal for moving said elongated signal carrier means in said lengthwise direction to a lengthwise position corresponding to said second moving control signal; and input means operatively associated with said first and second moving means and said plurality of reading means, for furnishing said first and second moving control signals and for furnishing read selection signals for energizing a selected one of said plurality of reading means.

2. A selection arrangement as set forth in claim 1, wherein said second moving means comprise step-by-step moving means moving said elongated signal carrier means a predetermined distance in said lengthwise direction during each of said steps; further comprising counting means for counting the steps said elongated signal carrier means has moved from a starting position, the count in said counting means therefore corresponding to said lengthwise position of said elongated signal carrier means.

3. A selection arrangement as set forth in claim 1, wherein said elongated signal carrier means comprise a magnetic tape; and wherein said individual reading means comprise magnetic heads.

4. A selection arrangement as set forth in claim 1, wherein said input means comprise program means receiving text selection signals signifying the text to be selected; input reading means for reading said text selection signals; register means for receiving so-read text selection signals; and converter means for converting said text selection signals into said first and second moving control signals and said read selection signal.

5. A selection arrangement as set forth in claim 4, wherein said text selection signals comprise a first, second and third digit; and wherein said first and second moving control signals and said read selection signal correspond to the digit value of said first, second and third digit, respectively.

6. A selection arrangement as set forth in claim 5, wherein said register means comprise a first, second and third register storing, respectively, said first, second and third digit.

7. A selection arrangement as set forth in claim 6, wherein each of said registers comprises a four-bit register.

8. A selection arrangement as set forth in claim 7, wherein said converter means comprise individual code converters, each connected to one of said registers.

9. A selection arrangement as set forth in claim 8, wherein each of said code converters is a binary-decimal code converter.

10. A selection arrangement as set forth in claim 1, wherein said input means comprise a manual input and an automatic input; and switching means for selecting either said manual or said automatic input.

11. A selection arrangement as set forth in claim 4, wherein said text selection signals each comprise a mark in one of a plurality of selectable locations on said program means; and wherein said reading means comprise a light source, a plurality of photoelectric elements arranged in operative proximity of said light source, and means for interposing said program means between said light source and said photoelectric elements.

12. A selection arrangement as set forth in claim 11, wherein said program means comprise groups of selectable locations on said program means, each of said group being associated with one of said first, second and third digits; further comprising means for advancing said program means relative to said input reading means; and stopping means for stopping the advance of said program means relative to said reading means in the presence of more than one mark in any one group of selectable locations.

13. A selection arrangement as set forth in claim 12, further comprising a plurality of amplifiers, one associated with each of said photoelectric elements; a threshold circuit; interconnecting means interconnecting the outputs of all of said amplifiers to the input of said threshold circuit in such a manner that said threshold circuit furnishes a threshold output signal in the presence of more than one amplifier output signifying a mark; and wherein said means for stopping the advance of said program means are responsive to said threshold output signal.

14. A selection arrangement as set forth in claim 13, wherein said means for stopping the advance of said program means is further stopping said advance by a time interval extending from entry of said first, second and third digit into said first, second and third register to the termination of read out from said registers.

15. A selection arrangement as set forth in claim 14, further comprising energizing means for energizing said input means; further comprising delay means interconnected between said energizing means and said photoelectric elements and said advancing means, for delaying the energization of said last-named means for a predetermined time period required for full energization of said light source.

16. A selection arrangement as set forth in claim 6, wherein said elongated signal carrier means has a first and second group of texts located, respectively, in a first and second lengthwise portion thereof; wherein said first and second lengthwise portion comprise, each, one half of said elongated signal carrier means; further comprising control switch means connected to said third register means, said control switch means having a first and second state corresponding, respectively, to an odd and even value stored in said third register, said control switch means controlling said second moving means to position said first or second group of texts in operative proximity to said reading means in dependence upon said first or second state respectively.

17. A selection arrangement as set forth in claim 8, wherein said input reading means read said first, second and third digit in series; wherein said input means further comprise gating means responsive to counting signals for gating the input to said first, second and third register; and additional counting means furnishing said counting signals in synchronism with the reading of said first, second and third digits respectively.

18. A selection arrangement as set forth in claim 11, wherein said program means has groups of selectable program storage locations, each of said groups being associated with one of said first, second and third digits; further comprising means for advancing said program means relative to said input reading means; and stopping means for stopping the advance of said program means relative to said reading means in the presence of more than one mark in any one group of selectable program storage locations.

* * * * *